A. G. NEVILLE.
STEERING WHEEL LOCK MECHANISM.
APPLICATION FILED FEB. 27, 1915.
1,161,954.
Patented Nov. 30, 1915.
2 SHEETS—SHEET 1.
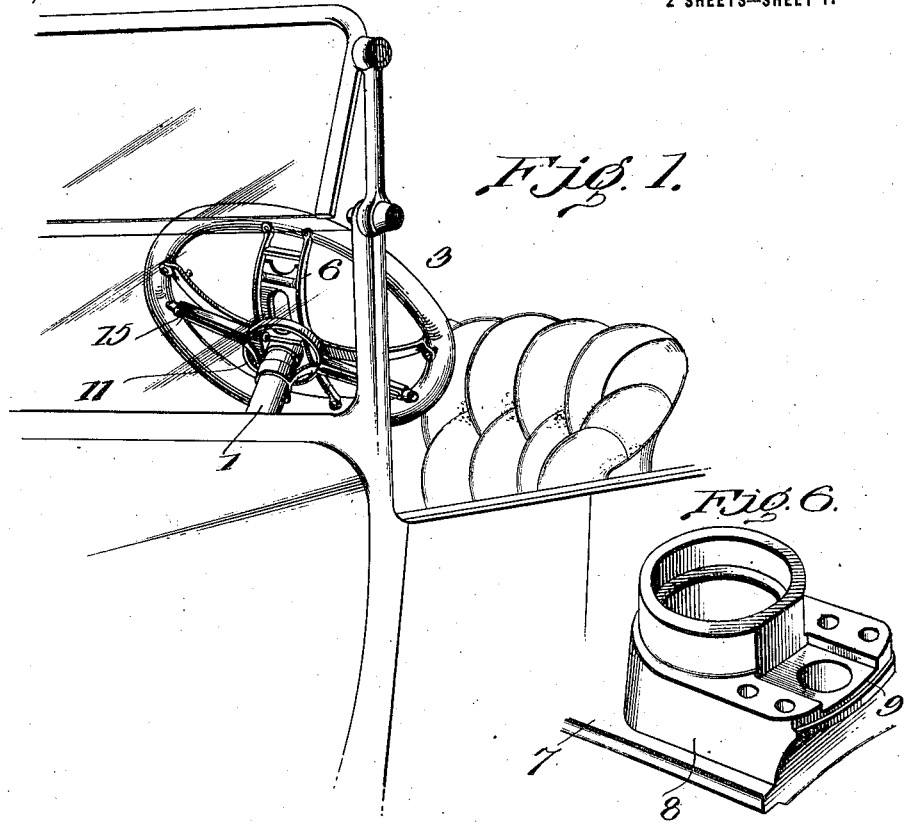
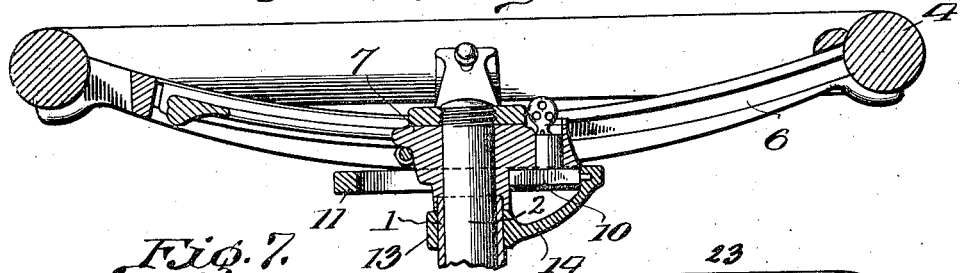
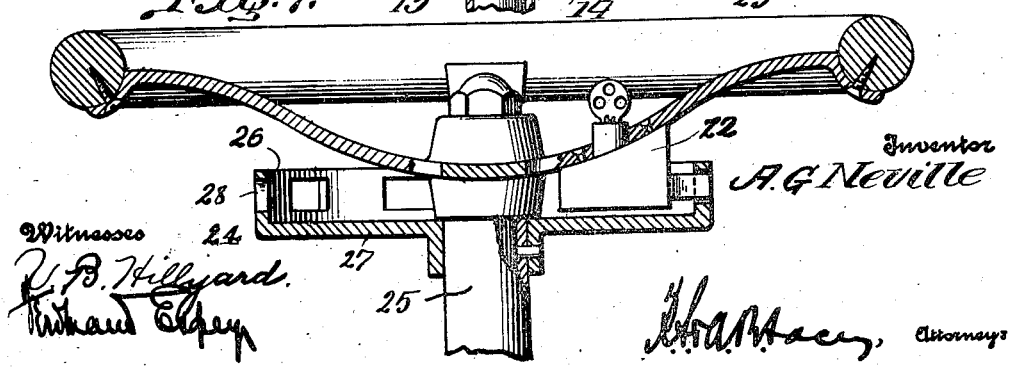

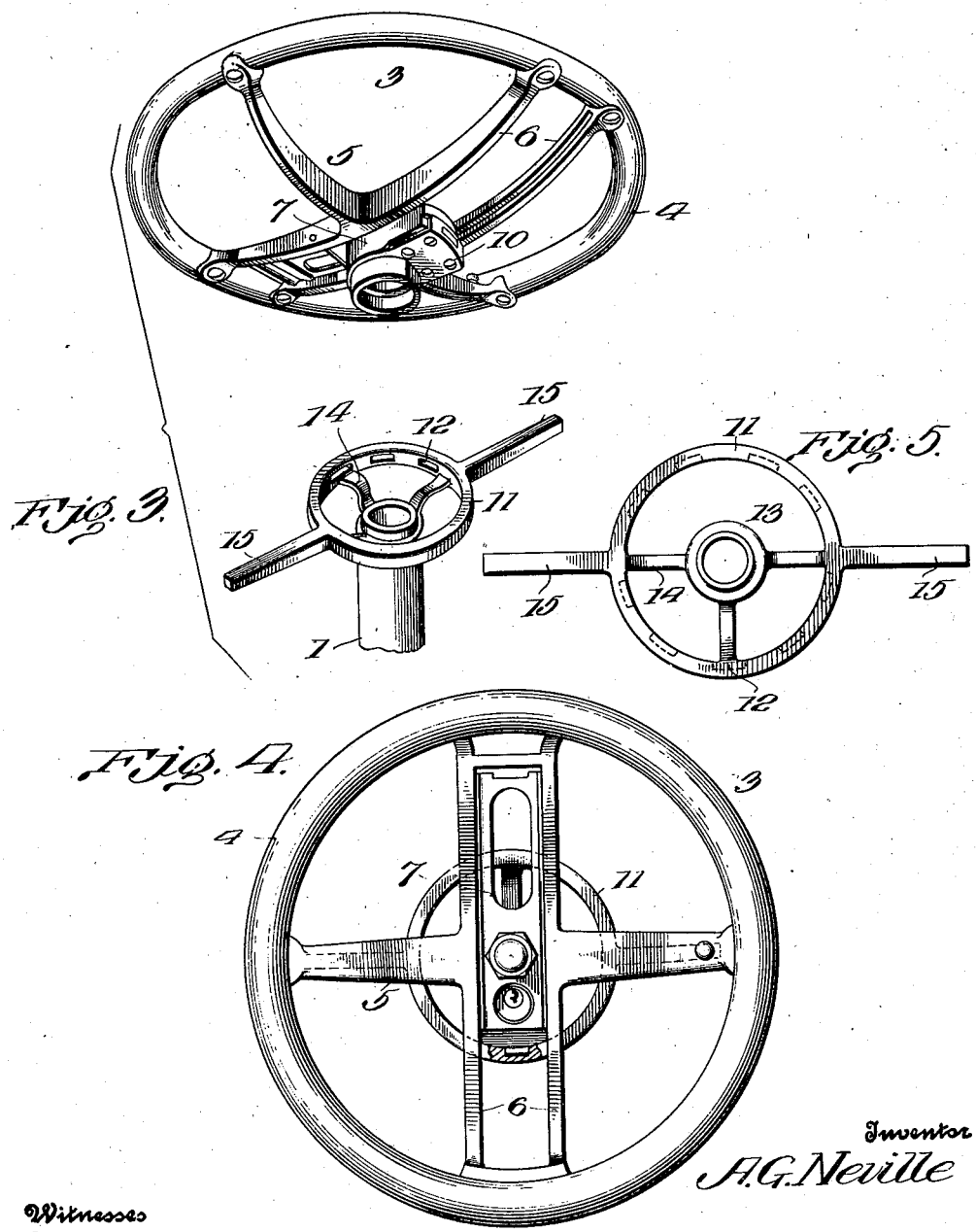

UNITED STATES PATENT OFFICE.

ASA G. NEVILLE, OF WELLSBURG, WEST VIRGINIA.

STEERING-WHEEL-LOCK MECHANISM.

1,161,954.  Specification of Letters Patent.  Patented Nov. 30, 1915.

Application filed February 27, 1915. Serial No. 10,991.

*To all whom it may concern:*

Be it known that I, ASA G. NEVILLE, a citizen of the United States, residing at Wellsburg, in the county of Brooke and State of West Virginia, have invented certain new and useful Improvements in Steering-Wheel-Lock Mechanism, of which the following is a specification.

The primary object of this invention is to prevent the unauthorized use of vehicles or carriers embodying steering mechanism for the proper control of the direction of travel.

The invention provides locking means for the steering wheel or like manually operable part whereby the same is held and prevented from being used in the accustomed manner with the result that a hindrance is presented to deter one from appropriating the machine without proper consent of the owner.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings;—Figure 1 is a fragmentary perspective view of part of a motor vehicle provided with a steering mechanism embodying the invention; Fig. 2 is a vertical central longitudinal section of a steering wheel and adjunctive parts provided with lock and supporting means in accordance with this invention; Fig. 3 is a perspective view of the steering wheel and member coöperating therewith, the parts being separated; Fig. 4 is a top plan view of the parts illustrated in Fig. 3, the same being assembled; Fig. 5 is a top plan view of the member which is attached to the steering column or casing; Fig. 6 is a detail perspective view of a portion of the head which is attached to the steering post and upon which the steering wheel is slidably mounted. Fig. 7 is a modification.

Corresponding and like parts are referred to in the following description and indicated in all the views of the drawings by the same reference characters.

The steering column or casing 1 and the steering post 2 are well known parts of steering mechanism, such as generally provided for motor vehicles or like carriers adapted to be manually steered. The steering post 2 is rotatably mounted within the column or casing 1 and is adapted to be connected in any manner with the steering element according to the nature of the vehicle or carrier to which the invention is applied. The manually operable part, such as a steering wheel 3 is secured to the upper end of the steering post 1 so as to rotate therewith. As indicated the steering wheel 3 is slidably mounted upon the post 2 so as to be thrown forward and upward to provide ample clearance both in front and in the rear of the steering column for passage between the steering wheel and dash or between the steering wheel and the seat. The specific mountings are substantially the same as those for which I have filed application for patents.

The steering wheel embodies a rim 4 and a spider 5, the latter embodying a longitudinally curved guide 6 which receives a head 7 which is secured to the upper end of the steering post 2. The longitudinal curvature of the guide 6 admits of the steering wheel being moved forward and upward so as to occupy an approximately vertical position with the result that ample passage-way is provided both in front and in the rear of the steering wheel so that ingress and egress to and from the vehicle is made easy. The head 7 is formed with an enlargement 8 which is recessed at 9 to receive a lock 10 which may be of any make requiring a special key for operation thereof. The outer end of the enlarged portion 8 is formed on the arc of a circle corresponding with the inner circular wall of a ring 11 which is attached to the steering column or casing 1. The ring or like part 11 coöperates with the bolt of the lock 10 to secure the steering wheel or like manually operable part in the required position when the vehicle or machine is left unattended, thereby preventing any unauthorized appropriation of the machine. As shown the recessed portion of the enlargement 8 extends into the plane of the ring 11 and the latter is formed with a plurality of recesses or notches 12 in its inner wall to receive the bolt of the lock when projected, thereby holding the steering wheel in the required position and preventing surreptitious control of the vehicle or machine.

The member attached in any substantial way to the upper end of the steering column or casing 1 comprises a collar 13, arms 14 and the ring or annulus 11. The collar 13 is in a lower plane than the ring 11 and the arms 14 extend inwardly and downwardly from the ring 11 so as not to obstruct the enlargement 8 of the head 7 when turning the steering wheel to the right or left. Other arms 15 project outwardly from the ring 11 and preferably constitute a part of the member which is attached to the column or casing 1. The arms 15 form supporting means for controlling devices such as circuit closers for signaling means or lighting systems. The arms 15 occupy a fixed position, hence hold the controlling devices in a definite position so that the operator may instantly reach the same for manipulation. The arms 15 are disposed with their extremities near the rim 3 of the steering wheel, hence the operator may manipulate the controlling devices at any time without releasing the hold upon the steering wheel. When the steering wheel is turned in one direction or the other the hands may slide upon the rim so as to occupy a position near the arms 15 so that the controlling devices mounted upon such arms may at all times be within easy reach to be actuated. It is noted that the steering wheel is free from controlling devices of any nature and full control thereof is had at all times for properly directing the machine. The controlling devices being supported upon the arms 15 are at all times readily accessible, hence the operator of the machine is not at a disadvantage in an emergency requiring prompt action to avert a casualty.

When the vehicle, carrier or like machine provided with steering mechanism substantially as hereinbefore indicated is left unattended the steering wheel or like manually operable part 3 may be locked and as a result no inducement is presented for surreptitious use of the machine by unauthorized parties because the steering mechanism is locked against control. The steering wheel 3 may be turned to any desired position and is secured by projecting the lock bolt into the proper notch or recess 12. While the steering wheel may be locked against rotation it nevertheless may be moved forwardly and upwardly to admit of the operator conveniently entering or leaving the machine. It is to be understood that the lock 10 is to be of a type requiring a special key, thereby preventing tampering therewith by the average person.

In the modification illustrated in Fig. 7 a lock 22 is secured in any manner to an arm of the spider of a steering wheel 23. The lock is arranged so that the lock bolt is projected outwardly. The lock member 24 attached to the steering post 25 comprises a hub, a rim 26 and an intermediate portion 27. The ring 26 is formed with a plurality of openings 28 into any one of which the lock bolt is adapted to be projected so as to secure the steering wheel 23 in the required position.

Having thus described the invention, what is claimed as new is:—

1. In steering apparatus, the combination of a steering column, a steering post rotatable therein, an annular member fixedly mounted upon the steering column, and a lock carried by the steering post and arranged within the space circumscribed by the annular member to be protected thereby and adapted to engage said annular member in any one of a plurality of positions to prevent rotation of the steering post.

2. In steering apparatus, the combination of a steering column, a steering post rotatable therein, an annular member fixedly mounted upon the steering column, a steering wheel attached to the steering post, a head provided upon the steering wheel and arranged within the space circumscribed by the annular member, and a lock mounted upon such head and adapted to engage the inner wall of the annular member to secure the steering wheel in any one of a plurality of positions.

In testimony whereof I affix my signature in presence of two witnesses.

ASA G. NEVILLE. [L. S.]

Witnesses:
J. G. JOHNSON,
W. C. CARMICHAEL.